(12) United States Patent
Ling et al.

(10) Patent No.: US 6,637,808 B1
(45) Date of Patent: Oct. 28, 2003

(54) DUMP VEHICLE BODY (76) Inventors: Brian S. Ling, 887 Prestwick Ct., Windsor, CA (US) 95492; Philip M. Ito, 2303 Carson St., Santa Rosa, CA (US) 95403; Gregory B. Krashel, 1902 Oneida Pl., Spokane, WA (US) 99203

( * ) Notice: Subject to any disclaimer, the term of this patent is extended or adjusted under 35 U.S.C. 154(b) by 0 days.

(21) Appl. No.: 10/066,372

(22) Filed: Jan. 30, 2002

(51) Int. Cl.$^7$ .................................................. B60P 1/04
(52) U.S. Cl. ...................................... 296/184; 296/181
(58) Field of Search ................................ 296/184, 181, 296/183; 298/1 R, 17 R; 105/261.2; D12/15, 98, 105

(56) References Cited

U.S. PATENT DOCUMENTS

| | | | |
|---|---|---|---|
| 1,627,336 A | * 5/1927 | Nelson | 296/184 |
| 1,883,936 A | * 10/1932 | Kerr | 298/1 R |
| 2,140,590 A | 12/1938 | Meininger | 296/28 |
| 2,490,532 A | 12/1949 | Maxon, Jr. | 298/22 |
| D187,020 S | * 1/1960 | Hockensmith, Jr. | D12/97 |
| 3,844,616 A | 10/1974 | Acker | 298/10 |
| 4,752,098 A | 6/1988 | Shock | 296/184 |
| 5,090,773 A | 2/1992 | Guillaume | 298/17 |
| 5,219,260 A | 6/1993 | Smith et al. | 414/345 |
| 5,454,620 A | 10/1995 | Hill et al. | 296/184 |
| 5,460,431 A | * 10/1995 | McWilliams | 298/17 B |
| 5,772,389 A | 6/1998 | Feller | 414/489 |
| 5,803,531 A | 9/1998 | Nielsen | 296/184 |
| 5,823,629 A | 10/1998 | Smith et al. | 298/23 |
| D403,651 S | * 1/1999 | Reiter | D12/221 |
| 6,116,698 A | 9/2000 | Smith et al. | 298/23 |
| 6,283,554 B1 | 9/2001 | Oberg | 298/8 T |
| 6,375,250 B1 | * 4/2002 | McWilliams | 296/183 |

FOREIGN PATENT DOCUMENTS

| | | | |
|---|---|---|---|
| JP | 2002254973 A | * | 9/2002 |
| SU | 1521631 | | 11/1989 |

OTHER PUBLICATIONS

Strong Industries; Web Page; www.superdumps.com/super-dumbs/sdfeatures.html; Dec. 19, 2001.
Literature by Legras Industries regarding Transmax End Dump Bed dated Feb. 2002.
Literature by Strong Super Dumps regarding Patent Pending Coned Shaped Bed dated Feb. 14, 2002.

* cited by examiner

Primary Examiner—Stephen T. Gordon
Assistant Examiner—Jason Morrow
(74) Attorney, Agent, or Firm—Scott W. Hewett (57) ABSTRACT A dump body for a dump truck or trailer has a half-pipe cross section at the cab end transitioning to a rectangular cross section at the dump end. Dump loads, especially slightly adhesive dump loads such as asphalt or damp sand, are less likely to adhere to the raised end when dumping, compared to a conventional rectangular dump body. Transitioning to a rectangular cross section at the dump end provides more even load distribution across the dump end compared to a conventional half-pipe dump body. In a particular embodiment, the center of gravity of the load is moved further toward the rear wheels during transit, and is kept lower during dumping than with conventional dump bodies.

24 Claims, 8 Drawing Sheets

DUMP VEHICLE BODY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to a body for a dump vehicle such as a dump truck, dump trailer, or dump semi-trailer that dumps from an end of the dump body.

BACKGROUND OF THE INVENTION

Dump vehicles are used in numerous applications for moving material from one location and depositing it in another. Dump vehicles include dump trucks, dump trailers, and semi-trucks with dump trailers and similar dump systems. Dump trailers are trailers that are made to be placed on a dumping mechanism or have a dumping mechanism built into the trailer. In one example, a dump truck pulls a dump trailer, both with loads. The dump truck drops the trailer, dumps the first load, and then the dump trailer, which fits inside the first dump body (commonly known as a "transfer" dump), is pulled, pushed, or otherwise loaded into the first dump bed and the second load is dumped. An example of such a system is discussed in U.S. Pat. No. 5,219,260 by Smith et al. entitled APPARATUS FOR TRANSFERRING A TRAILER BODY BETWEEN A TRAILER AND TRUCK BODY, issued Jun. 15, 1993.

A dumping semi-truck (which will be referred to as a "semi-dump" for convenience of discussion) has a tractor pulling a trailer that has a dump mechanism. The tractor-trailer semi-dump generally can haul larger, heavier loads than a dump truck. Furthermore, the trailer can be dropped and the tractor used for other purposes. Trailers used in semi-truck rigs typically have a rear set of wheels, with the forward portion of the trailer being supported by a pivoting disk that transfers a portion of the weight to be distributed between the front and rear wheels of the tractor. A set of jack supports, or legs, can be dropped at the front end of the trailer to support it and allow the tractor to de-couple from the trailer. In a standard trailer, or wagon, the trailer has both a front and rear set of wheels, and is pulled by a tongue that may or may not support some of the trailer weight. Usually the tongue is a beam or rigid yoke that provides strength in the direction of pull.

Dump bodies, whether on a truck, trailer, or semi-trailer, have taken many shapes, often to address specific applications. For example, dump trucks have been designed for use in open-pit mining operations that have a large capacity that facilitates rapid loading of fractured rock and dirt or ore from a bucket of a power shovel or similar source. They often dump into an accumulation pile or overburden pile.

Other dumps are done while the dump vehicle is moving. These so-called "rolling dumps" allow the material carried in the dump body to be advantageously spread or pre-spread over the job site. For example, a dump truck carrying road base can initiate dumping while moving forward and distribute the road base along the planned route. It is often similarly desirable to spread loads when delivering landscaping materials, arena footing, and even simple fill.

A spreader gate is often added to the back of a dump body to promote even distribution of the material delivered in a rolling dump. The spreader gate is generally a panel covering the back end of the dump body. One simple version of a spreader gate is simply hinged at the top. The bottom of the gate is released before dumping is startled, and the gate, while being free to swing open from the bottom, provides some transverse spreading of the material as it is dumped. Another version is lifted a selected amount to create an opening at the bottom end of the dump body. Other versions use mechanical devices, such as hydraulic cylinders and pistons, to swing or lift the spreader gate a selected amount. These devices allow the operator to open the spreader gate from the cab, i.e. without having to stop the dump vehicle, and to adjust the amount the spreader gate is open during the dump operation.

However, even with a spreader gate some mounding of the material can occur, particularly with a half-pipe dump body. A half-pipe dump body has basically a semi-circular or semi-ellipse cross-section, with or without sidewall extensions. Half-pipe dump bodies have found wide acceptance because of the strength, capacity, simplicity of manufacture, and lightweight that they provide compared to a rectangular dump box, for example. An example of a dump truck with a shell in the form of a half ellipse is shown in U.S. Pat. No. 3,844,616 by Acker, entitled DUMP TRUCK HAVING AN OPEN SHELL IN THE SHAPE OF ONE-HALF OF AN ELLIPSE, issued Oct. 29, 1974.

Another example of a dump bed in the form of an ellipse is sold under the name SUPERDUMPS™ by STRONG INDUSTRIES. The bed is tapered so that the sides widen toward the rear of the bed, and the radii of the ellipse also increase toward the rear. However, the curved rear edge of the dump bed can result in center mounding during a rolling dump.

In a rectangular dump box, the side load on the walls of the dump box can cause bowing. The walls are typically reinforced to avoid bowing, but this adds material cost and weight to the dump box and diminishes the weight of the load that can be carried by the vehicle on public roads because the maximum load is usually the gross weight minus the vehicle weight. While the rectangular dump box provides good material distribution in a rolling dump, material, especially viscous or sticky material such as wet sand or asphalt, can adhere to the corners of the dump box, especially the upper corners. Removing this material from the upper corners can be time consuming and frustrating for the driver or site crew, and can cause a separate mound of material at the end of the rolling dump.

Therefore, a dump body that provides more even dumping while reducing material adhesion during dumping is desirable.

BRIEF SUMMARY OF THE INVENTION

A dump vehicle body transitions from a tubular front end to a rectangular rear, or dump, end. The tubular front end has curved section with a radius of at least 20% of the body width to avoid material sticking in the upper region of the dump body during dumping. The dump end has a flat floor that reduces forming a mound of material in the center of the dumped load, which is particularly desirable during rolling dumps. The flat floor is particularly desirable when used in conjunction with a spreader gate. The flat floor extends at least 85% of the width between the walls of the dump vehicle body at the dump end.

In a particular embodiment, two sideportions are formed that transition from the curved section in front to L-shaped sections in the rear. The sidepieces are bent from a sheet of metal to form both the walls and the floor of the dump body. In a further embodiment, a floor piece is welded between the horizontal portions of the sidepieces (or tangentially to the curves). In another embodiment, the sideportions are formed to have a curve describing an arc of about 90 degrees with increasing radius from the dump end to the front end of the dump body. A flat floor portion extends between the sideportions, and in a particular embodiment is trapezoidal. In some instances, the dump body is rectangular when viewed from the top, in others it is trapezoidal or other shape(s).

DETAILED DESCRIPTION OF THE INVENTION

The present invention provides a dump vehicle body ("dump body") with improved load distribution, even load dumping, and good load clean out. The dump body transitions from a substantially curved section near the front or cab end of the body to a substantially rectangular section near the dump end of the body. The curved section allows viscous or semi-viscous loads, such as asphalt or wet sand, to slide out of the upper end of the dump body when unloading, and the rectangular rear section produces a more even dump distribution compared to an all-curved dump body.

I. An Exemplary Dump Body

Figure 1A:
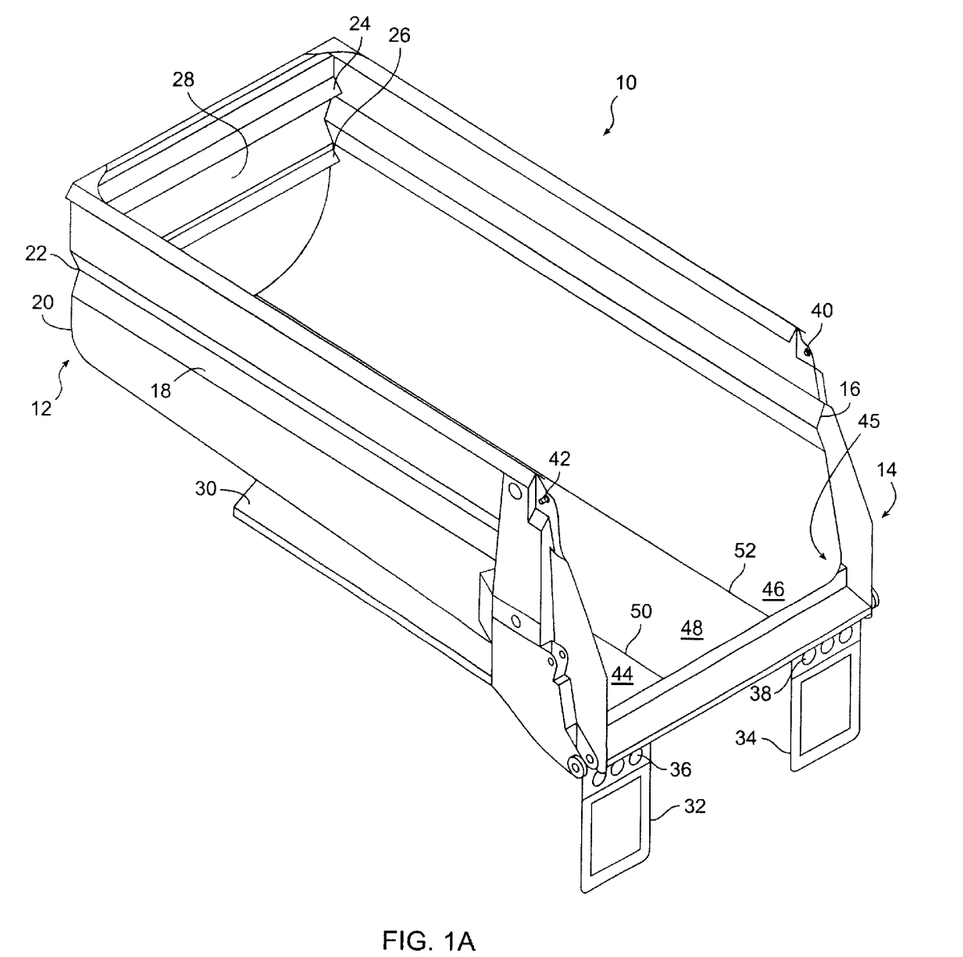
FIG. 1A is a simplified perspective view of a dump body according to an embodiment of the present invention.

FIG. 1A is a simplified perspective view of a dump body 10 according to an embodiment of the present invention. A front portion 12 of the dump body is substantially curved, while the rear or dump end portion 14 of the dump body is substantially rectangular. The curved front portion can take many shapes, including a semi-circular half-pipe, a semi-ellipse half-pipe, including modified half-pipes having a flat floor portion and/or vertical extension walls.

Flat or corrugated wall extensions 16, 18 extend beyond the curved section 20 of the dump body and increase the height of the dump body. In some cases, a fold 22 is formed in the wall to improve strength. This fold enhances rigidity of the wall without significantly diminishing the capacity of the dump body or increasing the weight of the dump body. Similar folds 24, 26 have been formed in the forward bulkhead 28 of the dump body. The forward bulkhead is near the cab or tractor of the dump vehicle. Other details of the dump body are shown, such as rear wheel fenders 30, mud flaps 32, 34, tail lights 36,38 and spreader gate hinges 40, 42.

The dump body has been fabricated out of three pieces of steel but could be fabricated out of more or fewer pieces, or other material(s), such as aluminum, stainless steel, fiberglass, and/or polyethylene. The gauge and type of the steel is chosen according to the intended use of the dump body, and generally ranges from about 0.1046 (12 gauge) to about 0.375 (⅜"). Thicker gauge might be used for dump vehicles that will be loaded with large rocks, while a thinner gauge might be used for a dump vehicle that will be used for delivering lightweight landscaping supplies, such as composted sawdust. The sidepieces 44, 46 are basically mirror images of each other, although this is not required, and transition from the curved section 20 in the front to an L-shaped section 45 in the rear. A floor piece 48 is welded to the sidepieces along weld seams 50, 52 although other configurations and attachment methods can be used. It is not necessary that the side and floor pieces be of the same gage. It is generally desirable to make the dump body as light as possible, while retaining sufficient strength, in order to maximize the load capacity of the vehicle.

The sides are formed using conventional computer-numerically-controlled ("CNC") methods with brakes and rollers actuated by hydraulic rams and similar techniques. Such techniques are well known in the field of producing conventional half-pipe dump bodies and similar equipment made of curved sheet metal. While CNC-hydraulic techniques are desirable, other fabrication methods may be apparent to one skilled in the art, and manually controlled forming machinery operated by a competent machinist can provide very good results. Although the floor piece is shown as being essentially rectangular and flat, it could take other forms, such as being curved at the forward end, transitioning from being curved at the forward end to being flat at the dump end, or being tapered toward the forward end in a triangular or trapezoidal shape.

Figure 1B:
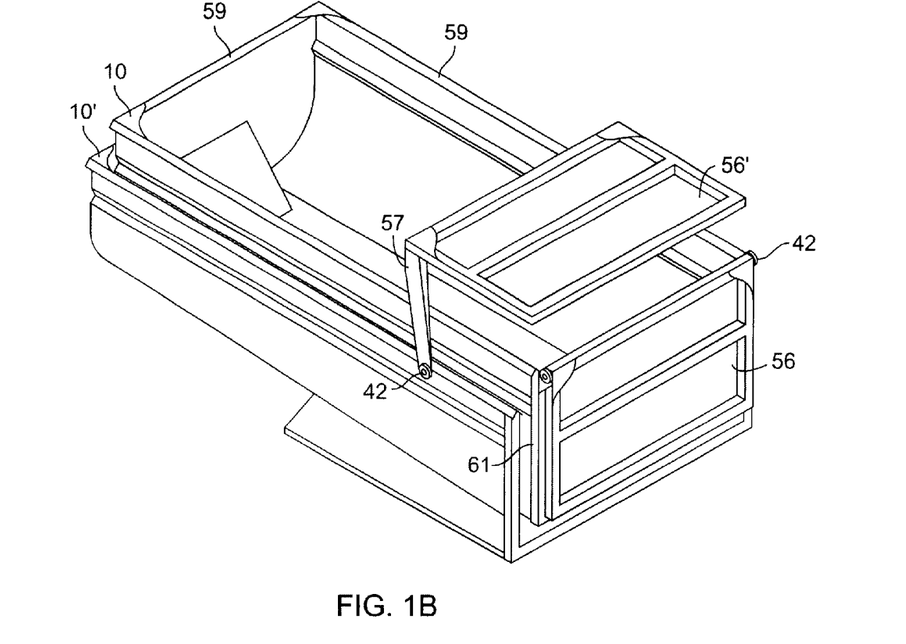
FIG. 1B is a simplified perspective view of a one dump body inside another with alternative spreader gates according to an embodiment of the present invention.

FIG. 1B is a simplified perspective illustration of "piggy-back" dump bodies 10, 10' with alternative configurations of spreader gates. The spreader gates can be raised and lowered with hydraulic rams, cables and pulleys, or similar mechanisms, or swing freely on hinges 42, generally being latched shut during loading and transit. A load is not shown in the second dump body 10 for clarity of illustration. The outer dump body 10' is mounted on a truck frame with a lifting mechanism (not shown), and the inner dump body 10 has been drawn into the outer dump body. The spreader gate 56' on the outer dump body 10' is mounted on arms 57 that allow the spreader gate to be raised with higher clearance for the inner dump body 10. This allows the walls of the inner dump body to extend higher for greater volume. The spreader gate 56 on the inner dump body 10 is hinged 42 at the rear of the dump body. The dump bodies include horizontal 59 and vertical 61 rails that form a frame for the body. The rails could be square, rectangular, or round tubing. Some rails can be rolled into the sheet or plate stock of the body walls, while other rails are extrusions of formed pieces attached to body walls by welding or other means.

II. Exemplary Cross Sections

Figure 2A:
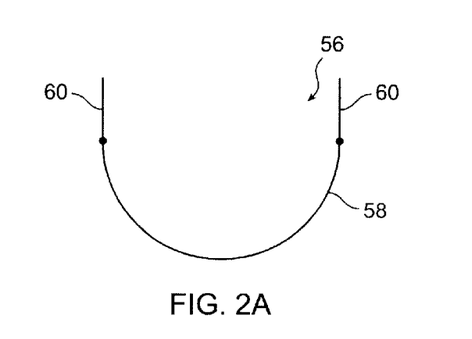
FIG. 2A is a simplified cross section near the front end of a dump body with a semi-circular half-pipe and vertical sidewalls according to an embodiment of the present invention.

FIG. 2A is a simplified cross section 56 of a semi-circular front portion of a dump body according to an embodiment of the present invention. The dump body includes a semi-circular half-pipe portion 58 with sidewalls 60 that extend the height of the dump body. The sidewalls can be permanently mounted, such as by welding additional steel plate to the half-pipe portion, or by providing brackets for mounting removable wood or metal panels. Some materials, such as dry sawdust, have a relatively low density, and the addition of the sidewalls allows a greater volume of the material to be transported with each load.

While material might stick in the corners of a conventional rectangular dump box, the wide curve of the half-pipe section facilitates a complete unloading of material. It is particularly desirable to provide a curved front section because that is the portion of the dump body that is lifted highest during unloading. If material adheres to the upper regions of the dump body, it can be difficult, dangerous, or time consuming to unload this material. This material might also form an undesirable mound at the end of the dump run, requiring further labor to smooth or otherwise distribute this mound.

Material adhering in the lower portion of the dump body is not as much of a problem for a few reasons. First, the lower regions are more accessible by a crew that can assist with its removal. However, it is less likely that material will adhere in this region because the flow of material from above assists in the removal of the lower material. In the higher regions, the material has an opportunity to set during transport. When the load is dumped, gravity must overcome this sticking or friction. In the lower regions, material from above is flowing over the lower material, assisting in dislodging any lower sticking material from the dump bed.

Figure 2B:
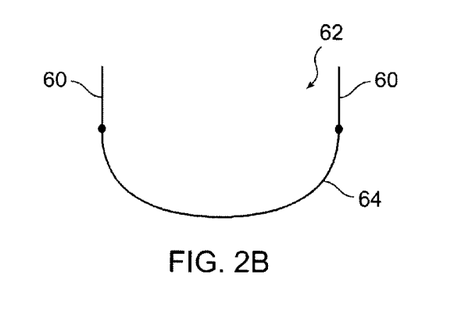
FIG. 2B is a simplified cross section near the front end of a dump body with a semi-ellipse half-pipe and vertical sidewalls according to another embodiment of the present invention.

FIG. 2B is a simplified cross section 62 of a semi-ellipse front portion of a dump body according to another embodiment of the present invention. The semi-ellipse half pipe 64 has been found to be advantageous for providing a strong dump body shell that transfers tensile forces through the shell material. The semi-ellipse provides strong, lightweight shell with high load carrying capacity and minimal material. Sidewalls 60 can be added, as discussed above in relation to FIG. 2A.

Figure 2C:
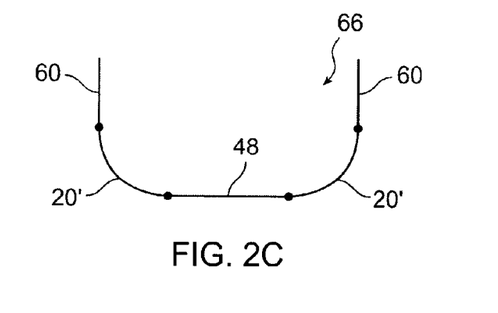
FIG. 2C is a simplified cross section near the front end of a dump body with a modified semi-ellipse half-pipe and vertical sidewalls according to another embodiment of the present invention.

FIG. 2C is a simplified cross section 66 of a modified semi-ellipse front portion of a dump body according to yet another embodiment of the present invention. The semi-ellipse half-pipe has been split and a flat floor panel 48 has been added between the half-pipe sections 20'. The half-pipe sections are semi-circular with a radius of at least 20% of the width of the body. Sidewalls 60 can be added to extend the height of the body. In a particular embodiment the half-pipe section has a radius of about 23 inches near the front end of the dump body. The curve is an arc of about 90 degrees that continues from the essentially vertical wall to the essentially horizontal floor. The flat portion at the rear is preferably at least 85% of the width of the body at the front in some embodiments. The ratio of the radius curve in the front body portion to the radius curve at the rear should be at least 3:1. In an alternative embodiment, the half-pipe section is semi-elliptical or modified semi-elliptical (with a flat floor portion disposed between elliptical side portions) with a minor radius of at least 20% of the width of the body.

Figure 2D:
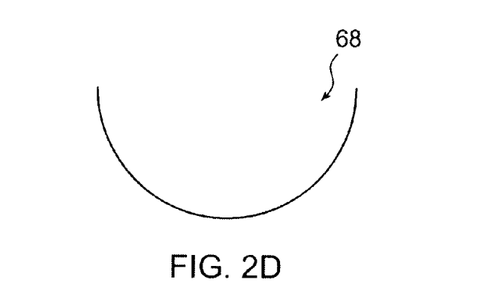
FIG. 2D is a simplified cross section near the front end of a dump body with a semi-ellipse half-pipe without sidewalls according to another embodiment of the present invention.

FIG. 2D is a simplified cross section 68 of a semi-ellipse half-pipe without sidewalls. Various elliptical radii or other curvatures can be chosen. Generally, the "front" portion of the dump body refers to that portion lying forward of a longitudinal center being the halfway point between the front bulkhead and the opposite end of the dump body. Other types of curves that might be chosen include parabolic curves, catenary, or spline curves, for example. The dump body transitions from an essentially rectangular rear or dump portion to a tubular or modified tubular front portion.

Figure 2E:
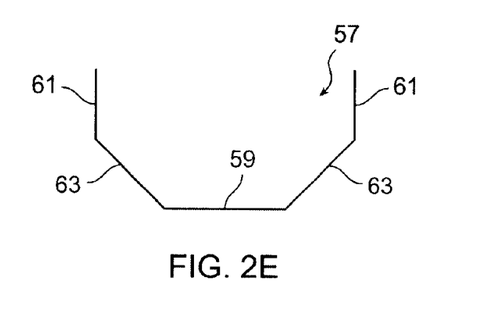
FIG. 2E is a simplified cross section of a front-end portion of a dump body according to another embodiment of the present invention.

FIG. 2E is a simplified cross section 57 of a front portion of a dump body according to another embodiment of the present invention. The cross section includes a flat floor portion 59, which is tapered toward the front of the dump body, wall portions 61, and sloping portions 63. The sloping portions 63 help concentrate the material in the center of the dump body to facilitate dumping while avoiding material sticking in the corners because the outside angle formed between the sloping segment and the wall portion 61, and between the sloping portion and the floor portion 59 is much less than 90 degrees. In one embodiment each angle is about 45 degrees, although the angles do not have to be equal. It is desirable that neither angle exceed 45 degrees to facilitate dumping material from the front portion of the raised dump body.

The sloping segments are tapered toward the dump end, and provide an embodiment that does not require bending of metal plate if the segments are welded along their lines of intersection, i.e. the dump body is fabricated from flat plates. Alternatively, embodiments of this dump body could incorporate one or more bent metal plates, or be bent from a single plate or sheet. Such bending is relatively less complex than bending the half-pipe embodiments illustrated in FIGS. 2A–2D. In a particular embodiment, the width of the floor segment at the dump end is at least about 85% of the total width (between wall segments), and at the front end the width of the floor portion is not more than about 60% of the width of the dump body at that end.

Figure 2F:
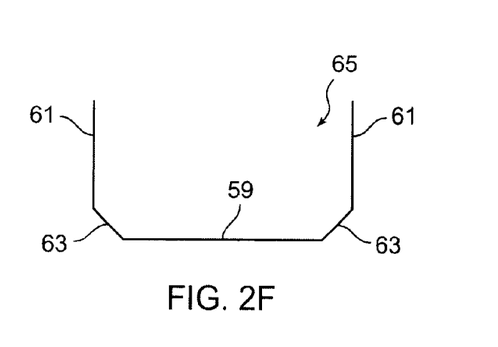
FIG. 2F is a simplified cross section of the dump-end portion of an embodiment of a dump body in accordance with FIG. 2E.

FIG. 2F is a simplified cross section 65 of the rear portion of the dump body discussed in accordance with FIG. 2E, showing the narrowed sloping portions 63 at the dump end. In an alternative embodiment, the sloped segments taper to a point, so that the wall segments 61 intersect the floor segment 59 at or before the dump end of the trailer.

Figure 3A:
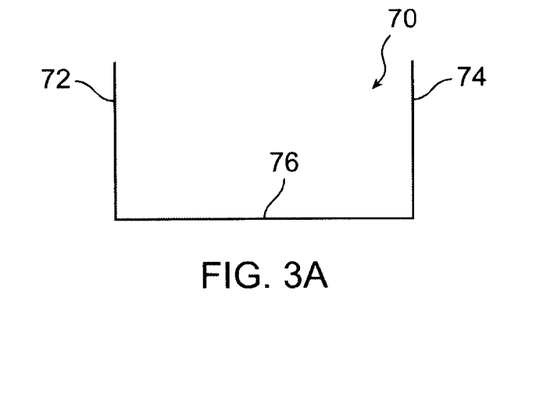
FIG. 3A is a simplified cross section near the dump end of a dump body according to an embodiment of the present invention.

FIG. 3A is a simplified cross section 70 of a rear portion of a dump body according to an embodiment of the present invention. This section is essentially similar to the rear section of a conventional rectangular dump box, but transitions from the curved front section to the flat rear portion. The sidewalls 72, 74 are essentially vertical in most applications, and may or may not incorporate the sidewall extensions shown in FIGS. 2A, 2B, and 2C. The sidewalls 72, 74 are joined to the floor 76 of the rear portion of the dump body, typically by welding. This rectangular rear portion allows the load from the curved front portion of the dump body to spread laterally during the dumping process, which reduces mounding of the material in the center. Conventional half-pipe dump bodies often form a pronounced center mound of material when dumped, even when dumped with a spreader gate. This mounding is especially undesirable when unloading during a rolling dump, such as when delivering asphalt or road base.

Spreader gates are used to control the load during a rolling dump. If the material in the load is stuck together, the spreader gate prevents the material from dumping out all at once. Half-round or semi-elliptical bodies dump very efficiently because the curved sides create a steep angle for the material. The curved sides also force the material towards the center of the body. These bodies can be made to spread evenly by using spreader gates to control the load and aprons to spread the load. An apron is a full-width flat shelf that is attached to the rear bulkhead of the body and extends beyond the end of the body. This enables even spreading throughout most of the dump run. As the amount of material diminishes, the material tends to become concentrated in the center causing uneven dumping.

The inventors recognized that dumping from a conventional half-pipe dump body with a spreader gate still resulted in the material mounding in the middle of the dumped load. It is believed that, even if the spreader gate nominally distributes the material across the opening between the spreader gate and the end of the dump body, there is greater force near the center than at the edges of the material exiting the spreader gate. This causes the material in the center to travel faster and unload a relatively greater volume of material. The transition from the curved front section to the rectangular section obtains the benefit of avoiding material sticking in the upper section of the dump body while allowing the material to spread out to the rectangular end section, resulting in more equal forces acting on the load during the dump, and resulting in a more even (less mounding) dump, with or without a spreader gate.

Figure 3B:
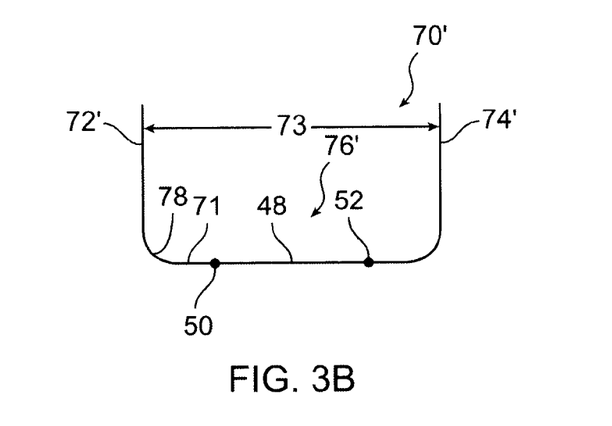
FIG. 3B is a simplified cross section near the dump end of a dump body according to another embodiment of the present invention.

FIG. 3B is a simplified cross section 70' of a rear portion of a dump body according to another embodiment of the present invention. The sidewalls 72', 74' are bent to form a radiused corner 78 and a portion 71 of the plate from which the sidewalls are formed is flat and is part of the floor 76'. A floor panel 48 is welded to the sidewalls along weld seams 50, 52.

Bending the wall panels to form the radiused corner allows the transition from large to small radii to be made accurately. The radius at the dump end is usually about 7.2 inches or less, depending on the width of the dump body, up to a radius that would allow about 85% of the floor to be flat at the dump end. A six-inch radius corner is acceptable and attainable with current bending techniques and typical material. Alternatively, the side portions form a sharp, i.e. non-radiused, angle at the dump end. Such a transition between portions is acceptable because the material dumping from the upper portions of the raised dump bed helps unload the lower material. In an alternative embodiment, two panels are formed into both sidewalls and floors and welded together down the middle of the floor. If the dump section is radiused, it is preferred that the ratio between the radius or major radius of the front tubular portion and the radiused corner at the rear rectangular portion is at least 3:1. In a particular embodiment, the flat floor portion at the dump end (i.e. that portion of the floor tangent to both radiused corners) is at least 85% of the inner width 73 of the rectangular end of the dump body between two essentially vertical sidewalls.

Figure 3C:
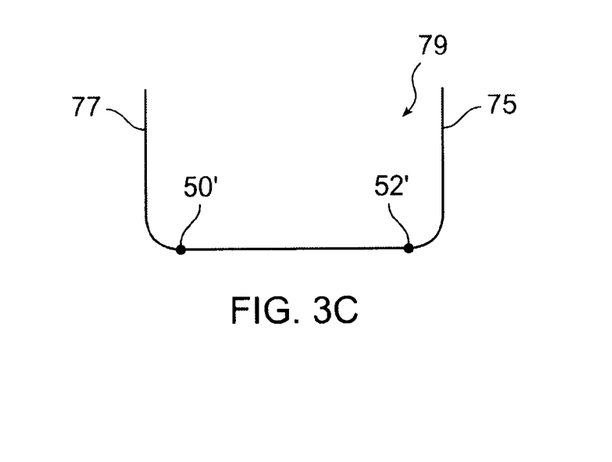
FIG. 3C is a simplified cross section near the dump end of a dump body according to another embodiment of the present invention.

FIG. 3C is a simplified cross section 79 of a rear portion of a dump body according to another embodiment of the present invention. The sidewalls 77, 75 are bent similarly to the sidewalls illustrated in FIG. 3B, but do not have the flat portion (see FIG. 3B, ref. num. 71). This moves the weld seams 50', 52' closer to the curved corners.

III. Illustrations of Further Advantages of the Present Invention

Figure 4A:
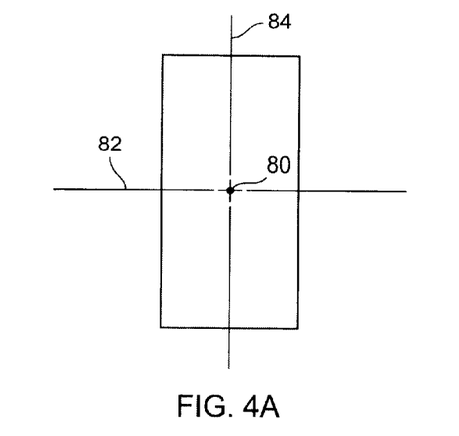
FIG. 4A is a simplified top view illustrating the location of the center of gravity of a load in a constant-section dump body.

FIG. 4A is a simplified top view of a level load in a conventional constant-section dump body, either box-type or half-pipe. For purposes of illustration, it will be assumed that the dump bodies are loaded in a level fashion on level ground. In practice, the distribution of some loads can be selected by loading more material toward the front or the rear, depending on the desired distribution. In a conventional constant-section dump body with a level load, the center of gravity 80 of the load is basically on the centerlines 82, 84 of the dump body.

Figure 4B:
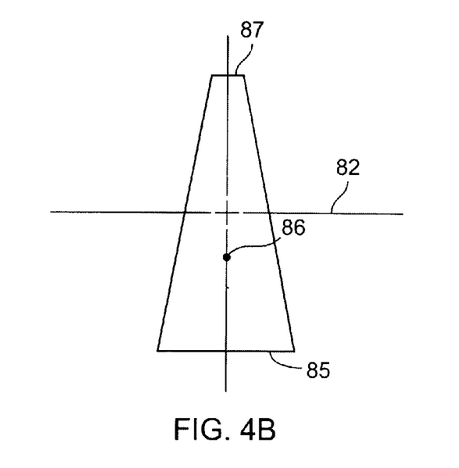
FIG. 4B is a simplified top view illustrating the location of the center of gravity of a load in a dump body according to one or more embodiments of the present invention.

FIG. 4B is a simplified top view of a level load in some embodiments of dump bodies according to the present invention. While it is possible to achieve the load distribution illustrated in FIG. 4A in some embodiments of the present invention, other embodiments provide a load distribution illustrated in FIG. 4B. The center of gravity 86 of the load is closer to the dump end 85 of the dump vehicle body than to the front end 87.

Even with a constant width, a dump body according to the present invention that transitions from FIG. 2C to FIG. 3B, for example, would still put the center of gravity of the load 86 behind the transverse center line 82. The relationship of the centers of gravity to the dump body is not drawn to scale and is intended to merely illustrate advantages that can be obtained by some embodiments of the present invention. This arrangement is advantageous when it is desirable to take weight off the front wheels, which in a truck are typically the steerable wheels. The rear wheels may have straight axles and multiple wheels to more easily bear the weight of the load. Furthermore, many states have a maximum load limit, such as less than 20,000 pounds, on the front wheels. Tapering the width of the dump body from a relatively wider rear section to a more narrow front section can provide further transfer of the weight of the load from the front to the rear; however, excessive tapering can reduce transfer volume (payload volume). In some embodiments a difference between the front and dump end widths of about 3–4 inches is desirable. In a particular embodiment, the walls of the dump body taper at an angle of about 0.5 degrees from the dump end to the front end.

Figure 4C:
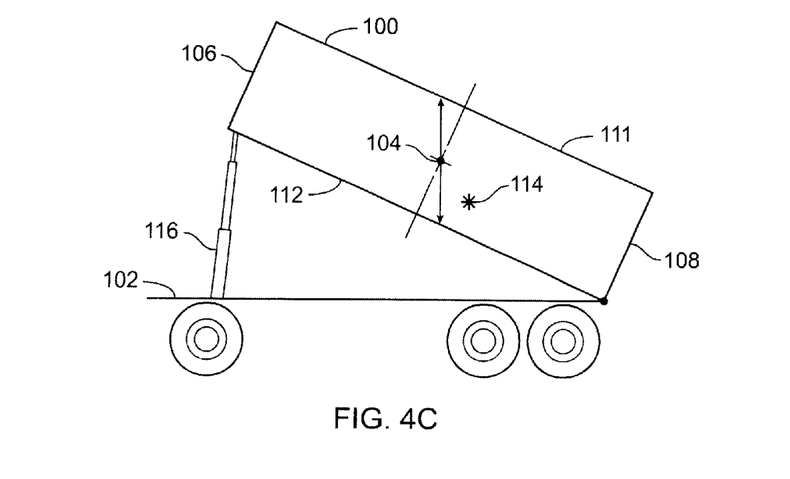
FIG. 4C is a simplified side view diagram of illustrating the center of gravity during dumping according to an embodiment of the present invention.

FIG. 4C is a simplified side view of a dump body 100 lifted from a truck or trailer 102. For purposes of discussion, it is assumed that the load has not begun to move, and that the dump body was originally loaded in a level fashion. In a conventional constant-section dump body, the center of gravity 104 of the load is essentially half way between the front 106 and rear 108 of the dump body and half way between the top 111 and bottom 112 of the dump body.

In comparison, the center of gravity 114 of a load carried by dump bodies according to at least some embodiments of the present invention is behind the halfway point and below the top-bottom center. This provides at least two desirable effects. First, the lower center of gravity enhances stability of the dump vehicle during dumping. Second, the lift mechanism 116 (which may be located in any of several locations along the dump body) has an easier task of lifting the loaded dump body.

The lowered center of gravity during dump arises from two circumstances. The direct effect is that more load is carried lower in the generally rectangular rear section than in the curved front section. Another effect arises because the center of gravity is behind the transverse centerline, as shown in FIG. 4C, and when the dump body is raised, this center is raised less because of the geometrical relationship between the center and the pivot axis about which the dump body is rotated (raised).

Figure 5A:
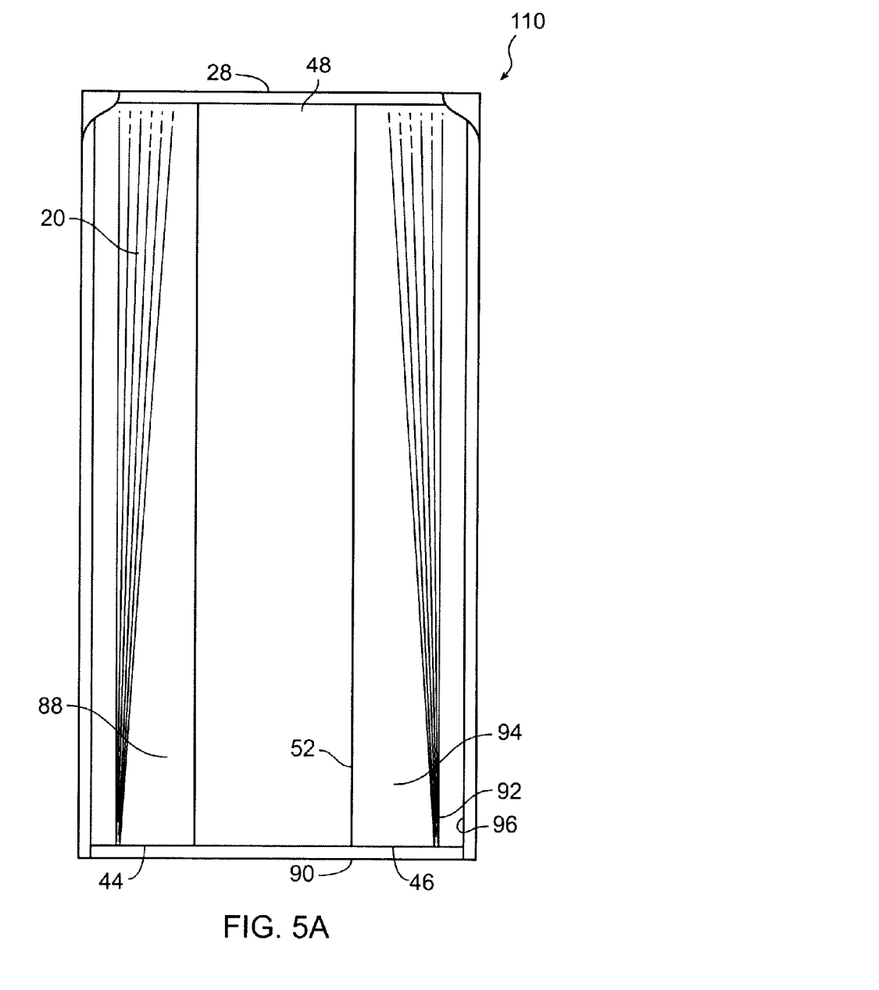
FIG. 5A is a simplified top view of a dump body according to an embodiment of the present invention.

FIG. 5A is a simplified top view of a dump body 110 according to an embodiment of the present invention. A center floor panel 48 is welded to two side panels 44, 46. Each side panel transitions from a curved section 20 near the front bulkhead 28 to a substantially "L" shaped section 88 near the tailgate 90, which could be a spreader gate. The L-shaped portion of the side panels retains a small radius of curvature 92 between the floor portion 94 and the wall portion 96 of the side panel near the tailgate. This allows the weld seam 52 to be moved away from the corner, which strengthens the dump body, and also reduces adhesion of material in the corners without significantly altering the distribution of material during dumping, and allows the transition from front to rear to be more easily made on a press brake.

The curved section 20 transitions from the L-shaped section with an increased radius of curvature. In one embodiment, the maximum radius of curvature is proximate to the forward bulkhead 28 and is at least 21 in. In some embodiments, one or more of the curves are elliptical. In a further embodiment the cross section transitions from semi-circular to semi-ellipse, to L-shaped. The front of the side panel can be curved all the way to the seam with the floor panel, or a flat floor portion can be included at this end of the side panel as well. In an alternate embodiment, a separate floor panel is omitted and both side panels include flat floor portions. In yet another embodiment, the floor panel is tapered, being wider at the dump end than at the front end.

Figure 5B:
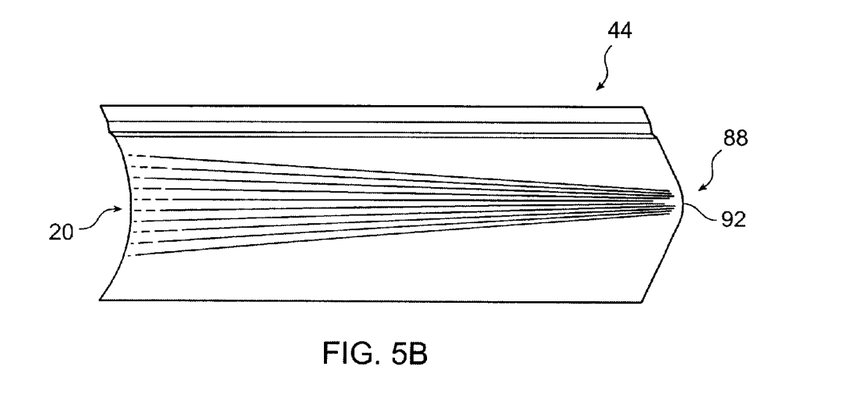
FIG. 5B is a simplified perspective view of a side panel according to an embodiment of the present invention.

FIG. 5B is a simplified perspective view of the side panel 44 illustrated in FIG. 5A. The curved section 20 transitions to the substantially "L" shaped section 88 with the small radius of curvature 92.

Figure 5C:
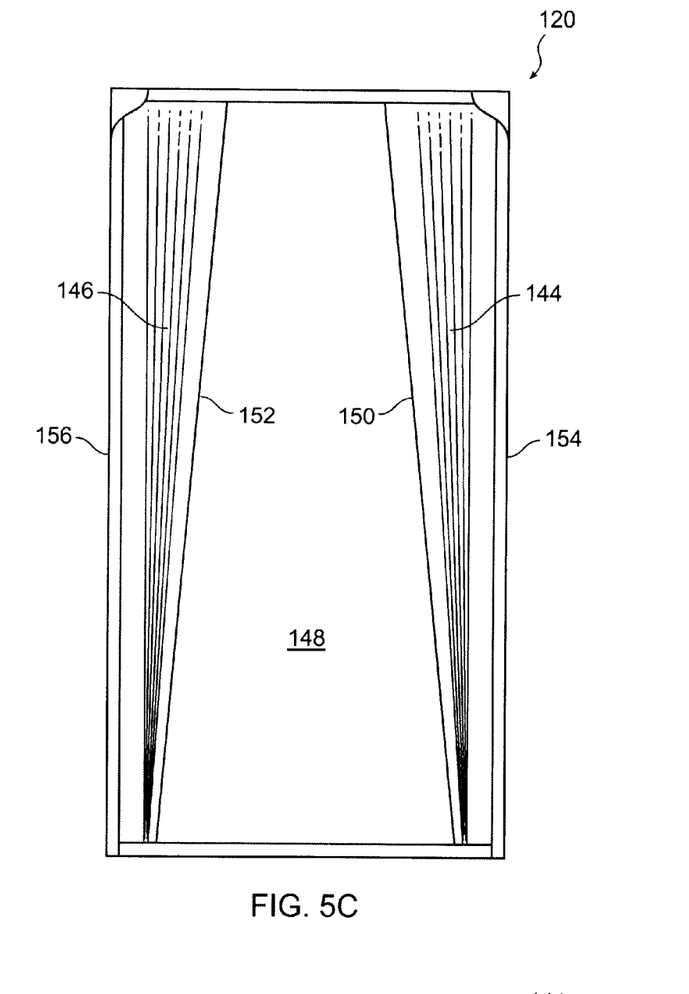
FIG. 5C is a simplified top view of a dump body according to another embodiment of the present invention.

FIG. 5C is a simplified top view of a dump body 120 with a trapezoidal floor panel 148. The trapezoidal floor panel is welded to two side panels 144, 146. These side panels curve from the weld joints 150, 152 to the side walls 154, 156, with a changing radius. In an alternative embodiment, the floor panel is triangular, i.e. tapers to a point. Side panels as illustrated in FIG. 5D or 5B, or other shaped side panels may be used with the trapezoidal floor panel.

Figure 5D:
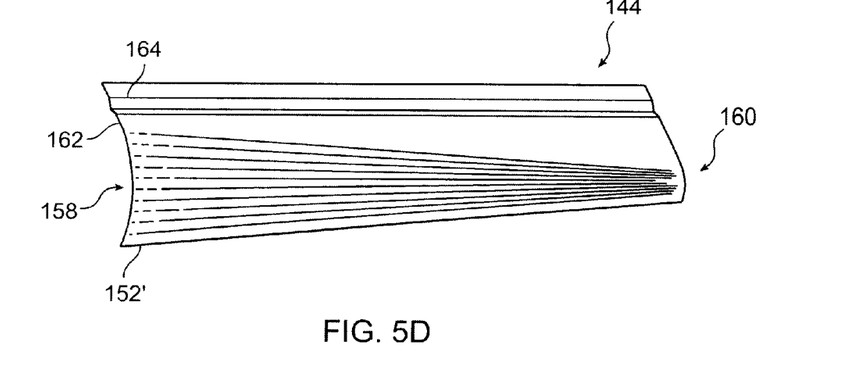
FIG. 5D is a simplified perspective view of a side panel according to another embodiment of the present invention.

FIG. 5D is a simplified perspective view of the side panel 144 illustrated in FIG. 5C. The forward end 158 has a greater radius of curvature than the dump end 160. Each curve defines an arc of about 90 degrees, but other angles can be used to define a non-vertical sidewall. Similarly, the arcs may be different at the front and dump ends. In this embodiment, the curve at the forward end 158 has a radius sufficient to define a curve from the edge 152' of the panel to near the top 162 of the side portion, just below the rail 164, thus essentially all of the wall is curved at the front section, but a smaller radius could be used.

Figure 6A:
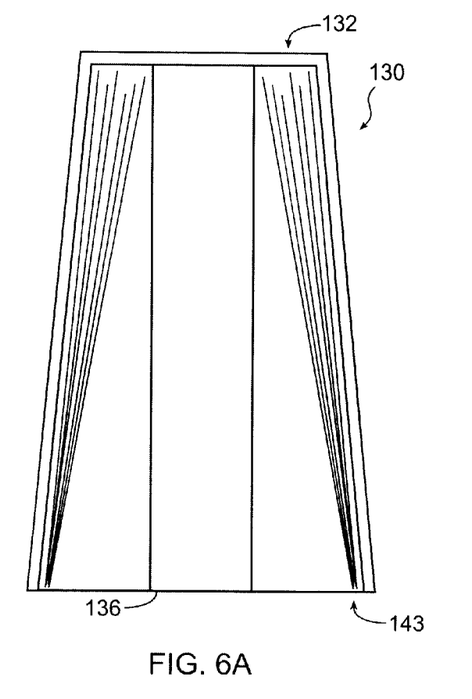
FIG. 6A is a simplified top view of a tapered dump body with flat floor according to yet another embodiment of the present invention.

FIG. 6A is simplified top view of a dump body 130 with a trapezoidal shape, i.e. the front end 132 is narrower than the dump end 134, in combination with a flat floor 136 at the dump end. The flat floor facilitates even dumping in a rolling dump, especially when used in conjunction with a spreader gate. A curved floor at the dump end can result in mounding of the dumped material, especially toward the end of the dump. The trapezoidal dump body can be made from bent side panels, as discussed in conjunction with FIGS. 5B and 5D, or from flat plates, as discussed in conjunction with FIGS. 2E and 2F.

Figure 6B:
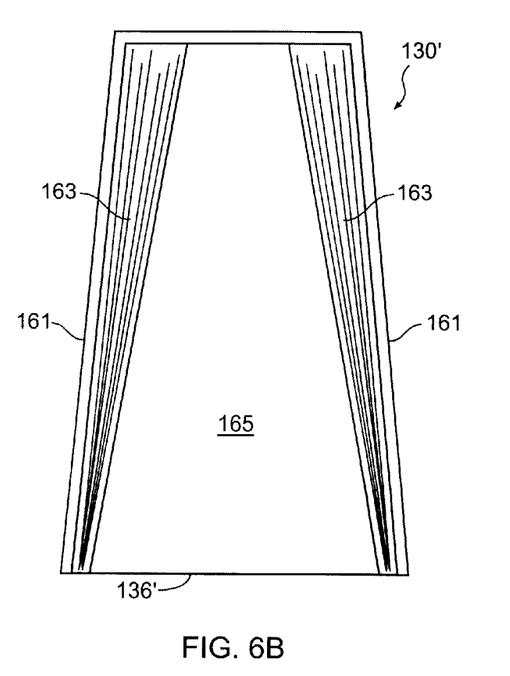
FIG. 6B is a simplified top view of a tapered dump body with, a flat floor and sloping portions according to another embodiment of the present invention.

FIG. 6B is a simplified top view of a tapered dump body 130' with sloping portions 163. The sloped portions extend in essentially a plane between the sidewalls 161 and the floor 165. The floor includes a flat portion 136' at the dump end of the body. The sloped portions taper from the front of the body to the rear, but do not have to extend all the way to the tailgate, and may be triangular. It is possible to form the sidewalls, sloping portions, and floor from a single sheet of steel or other material.

While the invention has been described with particular reference to specific embodiments illustrated above, it is understood that other embodiments may be utilized and structural changes made without departing from the scope of the present invention. Similarly, many features shown or discussed in one embodiment might be applied in another. For example while specific embodiments have been described using steel sections, dump bodies of the present invention can be made of other materials, such as aluminum, stainless steel, fiberglass and polyethylene. Similarly, while construction of embodiments has been described using press brakes and welding, other methods of fabrication could be used, such as molding processes, especially with other materials, such as plastic or fiberglass. Accordingly, the invention should not be limited by the illustrative embodiments, but is defined by the following claims.

What is claimed is:

1. A dump vehicle body comprising:
    a front portion having a first width and a first sidewall with a first curved portion having a first radius of at least 20% of the first width and a second sidewall with a second curved portion having a second radius of at least 20% of the first width, the front portion transitioning to
    a dump end portion having a floor extending between a the first sidewall and a the second sidewall defining a second width, a flat portion of the floor extending at least 85% of the second width.

2. A dump vehicle body comprising:
    a front portion having a first width and a curved portion with a first radius of at least 20% of the first width transitioning to a dump end portion having a floor extending between a first sidewall and a second sidewall defining a second width, a flat portion of the floor extending at least 85% of the second width, wherein the curved portion is elliptical and the first radius is a minor radius.

3. The dump vehicle body of claim 1 wherein the first sidewall and the second sidewall are both substantially perpendicular to the floor.

4. A dump vehicle body comprising:
a front portion having a first width and a curved portion with a first radius of at least 20% of the first width transitioning to
a dump end portion having a floor extending between a first sidewall and a second sidewall defining a second width, a flat portion of the floor extending at least 85% of the second width, wherein the first sidewall and the second sidewall are both substantially perpendicular to the floor, a first corner between the floor and the first sidewall and a second corner between the floor and the second sidewall each having a second radius of less than 0.33 times the first radius.

5. A dump vehicle body comprising:
a front portion having a first width;
a dump end portion having a second width;
a first sidepiece transitioning from a first curved section having a first radius of at least 20% of the first width through an arc of about 90 degrees at the front portion to a second radius of less 0.33 times the first radius through the arc of about 90 degrees at the dump end portion;
a second sidepiece transitioning from a second curved section having the first radius and the arc of about 90 degrees at the front portion to the second radius at the dump end portion; and
a floor piece disposed between and joined to the first sidepiece and the second sidepiece, the floor piece having a flat portion extending at least 85% of the second widths.

6. The dump vehicle body of claim 5 wherein the floor piece is rectangular.

7. The dump vehicle body of claim 5 wherein the floor piece is trapezoidal.

8. The dump vehicle body of claim 1 wherein the first sidewall, the second sidewall, and the floor are fabricated from sheet metal.

9. The dump vehicle body of claim 1 wherein a level load in the dump vehicle body has a load center of gravity closer to a dump end of the dump vehicle body than to a front end of the dump vehicle body.

10. The dump vehicle body of claim 1 wherein the front portion is between a transverse center line of the dump vehicle body and a forward bulkhead and the dump end portion is proximate to a tailgate.

11. The dump vehicle body of claim 1 wherein the front end portion is proximate to a forward bulkhead.

12. A dump vehicle body comprising:
a first sidepiece having a front end section and a dump end section, the front end section transitioning from a sidewall portion of the first sidepiece to a floor portion of the first sidepiece through a first arc of about 90 degrees having a first radius, and the dump end section transitioning from the sidewall portion to the floor portion through a second arc of about 90 degrees having a second radius, the first radius being at least three times the second radius,
a second sidepiece being substantially a mirror image of the first sidepiece, and
a floor piece disposed between and joined to the first sidepiece and the second sidepiece.

13. The dump vehicle body of claim 12 wherein the first radius is at least 21 inches.

14. A dump vehicle body comprising:
a first side portion transitioning from a first curved section proximate to
a front end to a second section proximate to
a dump end;
a second side portion transitioning from a third curved section proximate to the front end to a fourth section proximate to the dump end; and
a floor portion at the dump end being flat for at least about 85% of a width of the dump vehicle body at the dump end, wherein the first curved section has a first radius and the second section comprises a second curved section having a second radius, the first radius being greater than the second radius.

15. The dump vehicle body of claim 14 wherein a ratio between the first radius and the second radius is at least 3:1.

16. The dump vehicle body of claim 12 wherein the floor piece is trapezoidal.

17. The dump vehicle body of claim 12 wherein the dump vehicle body tapers from a second width at the dump end section to a first width at the front end section at an average taper angle of about 0.5 degrees.

18. A dump vehicle body comprising:
a first sidewall;
a second sidewall; and
a floor including a flat portion extending at least 85% of a first width between the first sidewall and the second sidewall at a dump end of the dump vehicle body, and not more than 60% of
a second width between the first sidewall and the second sidewall at a front end of the dump vehicle body, wherein the first width is greater than the second width.

19. The dump vehicle body of claim 18 wherein the first width is no more than 4 inches greater than the second width.

20. A dump vehicle body comprising:
a first sidewall;
a floor;
a first sloped portion disposed and extending in essentially a plane between the first sidewall and the floor, the first sloped portion being tapered from a first wider portion at a front end of the dump vehicle body to a first narrower portion toward a dump end of the dump vehicle body;
a second sidewall; and
a second sloped portion disposed and extending in essentially a plane between the second sidewall and the floor, the second sloped portion being tapered from a second wider portion at the front end of the dump vehicle body to a second narrower portion toward the dump end of the dump vehicle body.

21. The dump vehicle body of claim 20 wherein the floor is trapezoidal.

22. The dump vehicle body of claim 20 wherein the floor includes a flat portion extending at least 85% of a width of the dump end of the dump vehicle body.

23. The dump vehicle body of claim 12 wherein the front cross section is rounded.

24. The dump vehicle body of claim 12 wherein the floor piece is rectangular.

* * * * *

UNITED STATES PATENT AND TRADEMARK OFFICE
CERTIFICATE OF CORRECTION

PATENT NO. : 6,637,808 B1
DATED : October 28, 2003
INVENTOR(S) : Brian S. Ling et al.

It is certified that error appears in the above-identified patent and that said Letters Patent is hereby corrected as shown below:

<u>Title page,</u>
Item [75], Inventors, "Philip M. Ito" should read -- Phillip M. Ito --; and
"Gregory B. Krashel" should read -- Gregory B. Kreshel --.

Signed and Sealed this

Second Day of March, 2004

JON W. DUDAS
*Acting Director of the United States Patent and Trademark Office*